US005751825A

United States Patent [19]

[11] Patent Number: 5,751,825

Myers et al.

[45] Date of Patent: May 12, 1998

[54] COMBINATION ELECTRONIC METRONOME AND HEADPHONE UNIT

[76] Inventors: Robert A. Myers, 6034 Vantage Ave., N. Hollywood, Calif. 91606; Lara L. Greenamyer, 5921 Colbath, Van Nuys, Calif. 91407; Robert J. Kasha, 9246 Geyser Ave., Northridge, Calif. 91324

[21] Appl. No.: 292,581

[22] Filed: Aug. 19, 1994

[51] Int. Cl.$^6$ .......... G01G 7/00

[52] U.S. Cl. .......... 381/118; 381/74

[58] Field of Search .......... 84/484, 477 B, 84/464 R; 381/118, 74

[56] References Cited

U.S. PATENT DOCUMENTS

| | | | |
|---|---|---|---|
| 3,540,344 | 11/1970 | Veech | 84/484 |
| 4,321,433 | 3/1982 | King | 179/156 R |
| 4,583,443 | 4/1986 | Senghaas | 84/484 |
| 4,673,893 | 6/1987 | Shorkey | 331/64 |
| 4,982,642 | 1/1991 | Nishikawa et al. | 84/484 |
| 5,275,082 | 1/1994 | Kestner-Clifton et al. | 84/477 B |
| 5,404,385 | 4/1995 | Ben-Haim | 377/24.2 |

*Primary Examiner*—Edward L. Coles, Sr.
*Assistant Examiner*—Stephen Brinich

[57] ABSTRACT

Headphones for acoustical reproduction of music or various audio signals and an electronic metronome device included therein. The headphones comprising a headband, two earcups, a first set of transducers housed one each within each earcup which receive and reproduce electronic audio signals from an exterior source, an electronically actuated metronome circuit used as a tempo device housed within the earcups, a second set of transducers housed one each within each earcup to produce the audio signals originating from the metronome circuit, a tempo control switch for increasing and decreasing the time beats originating from the metronome circuit, a volume control switch for increasing and decreasing the loudness of the time beats originating from the metronome circuit, a power source housed within the earcups to drive the metronome circuit, a line out jack to provide the clicking sound produced by the metronome circuit to an auxiliary component, a blinking light to give a visual metronome reference, and a cord having a conventional headphone jack plug attached.

7 Claims, 3 Drawing Sheets

COMBINATION ELECTRONIC METRONOME AND HEADPHONE UNIT

BACKGROUND—FIELD OF INVENTION

This invention relates to headphones, specifically to headphones containing an electronic metronome.

BACKGROUND—DESCRIPTION OF PRIOR ART

The use of a metronome for the purpose of teaching music students proper tempo is a common practice. The prior art consists primarily of two different types of metronome devices. The first being a mechanical device and the second being an electronic device.

The first type of metronome is a mechanical device consisting of an adjustable weight and an oscillating rod attached to a gearbox. The adjustable weight is moved up and down the rod to increase and decrease the speed of the swinging rod. The swinging rod makes an audible click at the end of every cycle. This type of mechanical metronome is well established in the prior art. The major disadvantage of this type of metronome is that the loudness of the clicking sound is not capable of being increased or decreased. A student playing an instrument which is louder than the metronome can not increase the volume of the clicking sound which could then be heard over the sound originating from the instrument.

The second type of metronome is an electronic device. The device consisting of an electronic circuit which produces a clicking sound through one or more speakers actuated by a power source. This type of electronic metronome is also well established in the prior art.

The electronic metronome has several advantages in comparison to the mechanical metronome. The loudness of the clicking sound could now easily be increased through the speakers and a much more sophisticated and complex pattern of click tracks was now possible to produce. The practicing musician could now increase the volume of the metronome to hear the clicking sounds over a loud instrument.

Unfortunately, the metronome was now so loud that it could be heard by everyone in close proximity to the musician. One could not use this type of metronome when performing in front of an audience because the click track would be heard with the music. One could also not use this type of metronome in a recording studio, because the microphone that the musician is playing the instrument into would record the click track along with the music.

A solution to this problem was proposed by U.S. Pat. No. 3, 540,344 to Robert D. Veech, 1970 Nov. 17. The use of an earphone was introduced to be attached to the electronic metronome. This was done to isolate the clicking sound only to the person wearing the earphone, and thus allowing a musician to play or practice an instrument without anyone in the vicinity being able to hear the click track produced by the metronome.

However, the use of a separate electronic metronome creates the need for extra cords that interfere with the musician while playing an instrument. And there is also the possibility of breaking a separate metronome device by dropping it, knocking it off of a desk or stand or by pulling it off of a desk or stand by inadvertently pulling on the attached cord.

But even when these obstacles are overcome there are several situations when an electronic metronome device supplying a click track through an earphone or conventional headphones is inadequate.

For instance, some musicians who play electronic instruments like to practice and listen to them only through the use of headphones. This allows the musician to practice what might otherwise be very loud instruments, such as electronic drums or an electric keyboard, while not producing music audible by anyone not wearing headphones. In this situation it is impractical for musicians to wear an earphone providing a click track from a metronome and headphones providing a separate audio track at the same time. This is an awkward and uncomfortable solution to this problem.

Another example of the inadequacy of using an electronic metronome device supplying a click track through an earphone or conventional headphones occurs when recording music.

Musicians wear headphones when recording music to listen to an audio track which has to be heard by the musician and not by the microphone that is recording what the musician is playing. If the musician wants to hear a metronome and an audio track through the same headphones, an audio mixing board component with a separate monitor channel must be used. However, the vast majority of mixing boards have only one monitor channel to supply the click track. Thus, if more than one musician is listening to an audio track and one of them wants to hear a click track, usually the drummer, all of the musicians must listen to the click track with the audio track whether they want to or not. An audio mixing board containing two monitor channels is necessary to supply an audio track and a metronome track to only one musician and just an audio track to all of the others. The price of a mixing board possessing two monitor channels is extremely expensive and so is cost prohibitive to home studios. Also, many professional studios that are available to be rented by the public do not possess two monitor capability.

OBJECTS AND ADVANTAGES

Accordingly, several objects and advantages of the present invention are:

(a) to provide a metronome device which is easy to increase in volume;

(b) to provide a metronome capable of producing complex patterns of audible click tracks;

(c) to provide a convenient means of listening to an audio track and a click track audible only to a musician playing an instrument. A separate metronome device is no longer needed to play and or record music while listening to an audio track through headphones;

(d) to provide for a way of listening to a metronome while not increasing the amount of cords from any separate devices which might interfere with the musician;

(e) to provide for a way of listening to a click track without the possibility of breaking a separate metronome device;

(f) to provide a comfortable means of listening to an audio track and a click track not audible to anyone else by eliminating the use of earphones worn in one or both ears which produce a click track and separate headphones which produce an audio track;

(g) to provide a relatively inexpensive means of listening to an audio track and a metronome click track that is heard only by a musician who is playing an instrument by eliminating the need for a costly studio mixing board.

Further objects and advantages of the invention will become apparent from a consideration of the ensuing description and drawings.

DRAWING FIGURES

In the drawings, closely related figures have the same number, but different alphabetic suffixes.

Reference Numerals In Drawings

| | | | |
|---|---|---|---|
| 10 | Headband cushion | 12 | Headband |
| 14A and 14B | Support Brackets | 16A and 16B | Earcup Assemblies |
| 18A and 18B | Adjusting hinges | 20 | Stereo cable |
| 22 | Stereo plug assembly | 24A and 24B | Metronome transducers |
| 26A and 26B | Full Range Speakers | 28A and 28B | Speaker Boards |
| 30A and 30B | earcup cushions | 32 | Multi-conductor cable |
| 34 | Tempo adjustment knob | 36 | Tempo scale |
| 38 | Female line out jack | 40 | On/off switch and volume control knob |
| 42 | On\off volume scale | 44 | light indicator |
| 46 | Power source | 48A and 48B | Removable earcup face-plates |
| 50 | Metronome circuit | 52 | Tempo adjustment potentiometer |
| 54 | Potentiometer washer | 56 | Potentiometer nut |
| 58 | Line out jack washer | 60 | Line out jack nut |
| 62 | Metronome on\off switch | 64 | Metronome volume potentiometer |
| 66 | Volume washer | 68 | Volume nut |
| 70 | Conductor | 72 | Conductor |
| 74 | Conductor | 76 | Conductor |
| 78 | Conductor | 80 | Conductor |
| 82 | Conductor | 84 | Conductor |
| 86 | Conductor | 88 | Conductor |
| 90 | Conductor | 92 | Conductor |
| 94 | Conductor | 96 | Conductor |
| 98 | Conductor | 100 | Conductor |
| 102 | Conductor | 104 | Conductor |

DESCRIPTION

Figure 1:
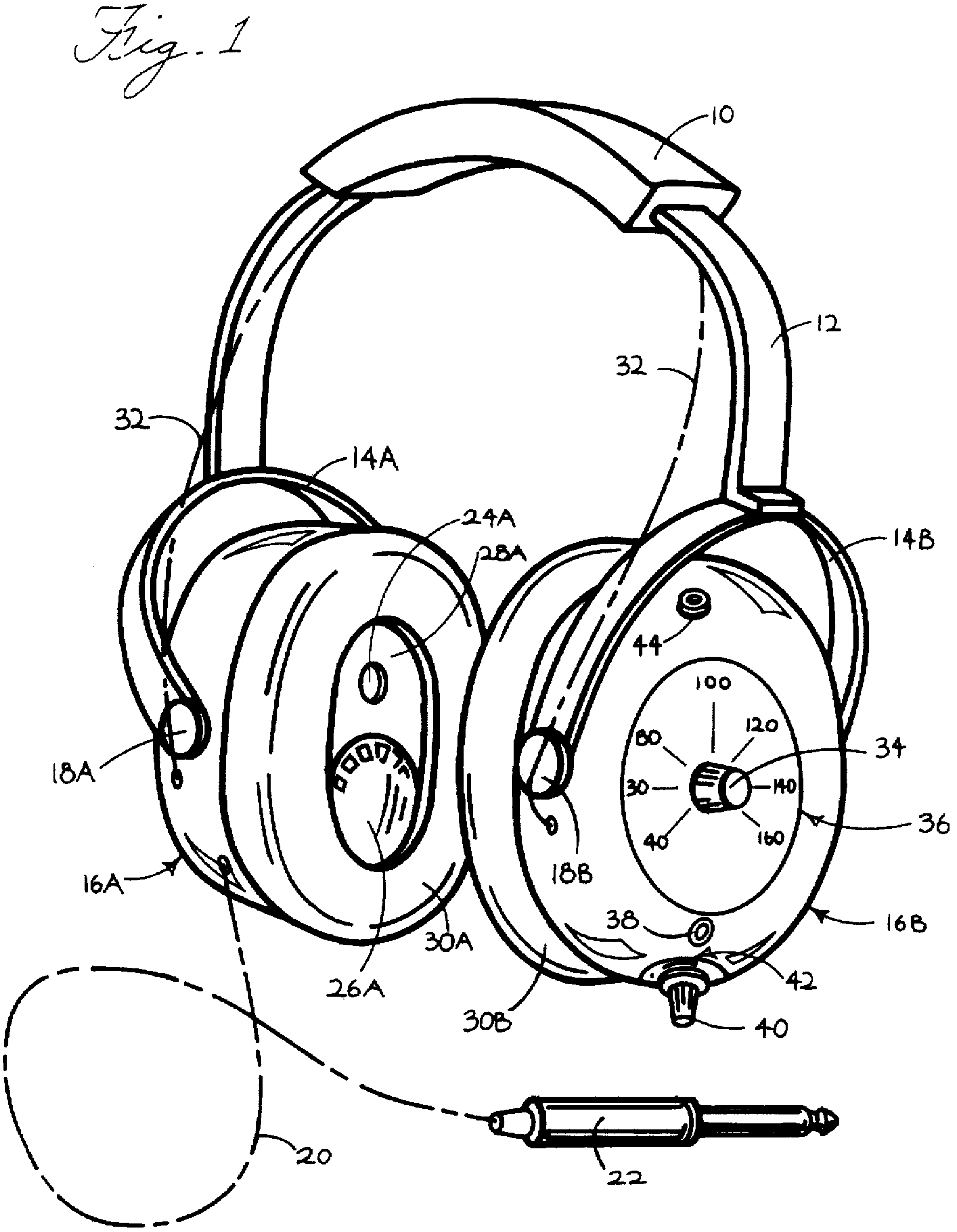
FIG. 1 shows an exploded view of a headphone device.

FIG. 1 shows a preferred embodiment of the invention. A headband cushion 10 surrounds a headband 12. Headband 12 is attached to a set of support brackets 14A and 14B. Brackets 14A and 14B are attached to a set of earcup assemblies 16A and 16B by a set of adjusting hinges 18A and 18B. Earcup 16A contains a stereo cable 20 leading to a conventional stereo plug assembly 22. Earcup 16A contains a metronome transducer 24A and a full range speaker 26A mounted to a speaker board 28A. An earcup cushion 30A is mounted to earcup 16A. A multi-conductor cable 32 leads from earcup 16A through cushion 10 and into earcup 16B. Earcup 16B contains a tempo adjustment knob 34 which enables the reading of a tempo scale 36. Earcup 16B contains an on/off switch and volume control knob 40 which enables the reading of an on/off volume scale 42. A light indicator 44 is mounted to earcup assembly 16B.

Figure 2B:
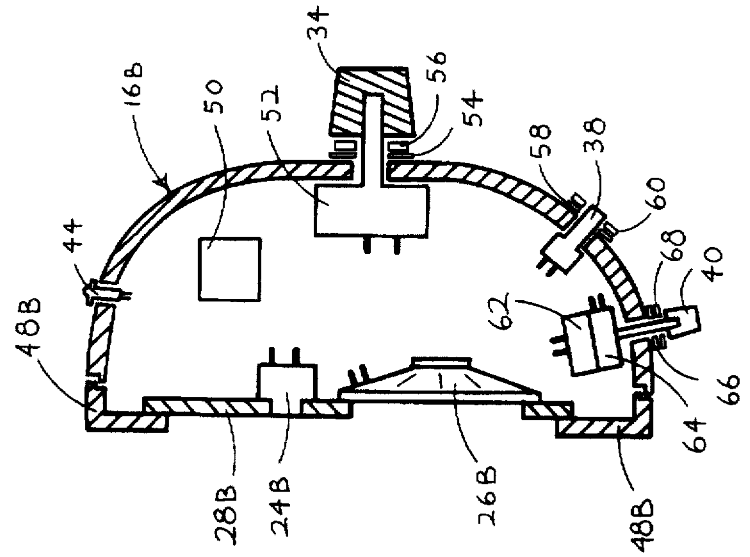
FIGS. 2A and 2B show a sectional view of an earcup assembly.
Figure 2A:
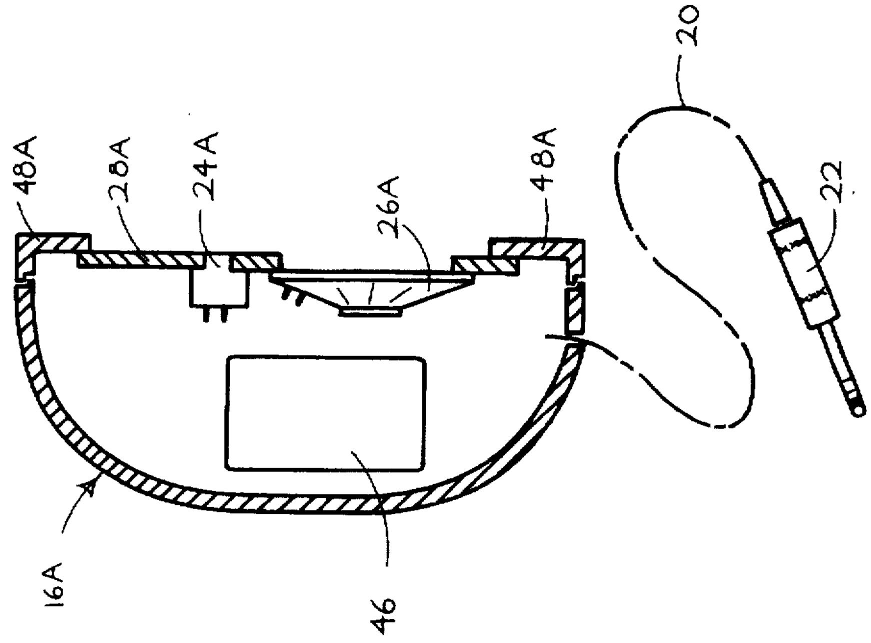

FIGS. 2A and 2B show a sectional view of earcups 16A and 16B. FIG. 2A shows earcup 16A containing a power source 46. Transducer 24A and speaker 26A are mounted to speaker board 28A. Speaker board 28A is fixed to a removable earcup face-plate 48A. Cable 20 exits earcup 16A and attaches to plug 22. FIG. 2B shows a sectional view of earcup assembly 16B. Earcup 16B contains a metronome transducer 24B and a full range speaker 26B mounted to a speaker board 28B. Speaker board 28B is fixed to a removable earcup face-plate 48B. A metronome circuit 50 is mounted inside earcup 16B. A tempo adjustment potentiometer 52 is mounted to earcup 16B by a potentiometer washer 54 and a potentiometer nut 56. Knob 34 is attached to tempo potentiometer 52. Line out jack 38 is mounted to earcup 16B by line out jack washer 58 and line out jack nut 60. A metronome on/off switch 62 and a metronome volume potentiometer 64 are mounted to earcup 16B by a volume washer 66 and a volume nut 68. Knob 40 is connected to volume potentiometer 64.

Figure 3:
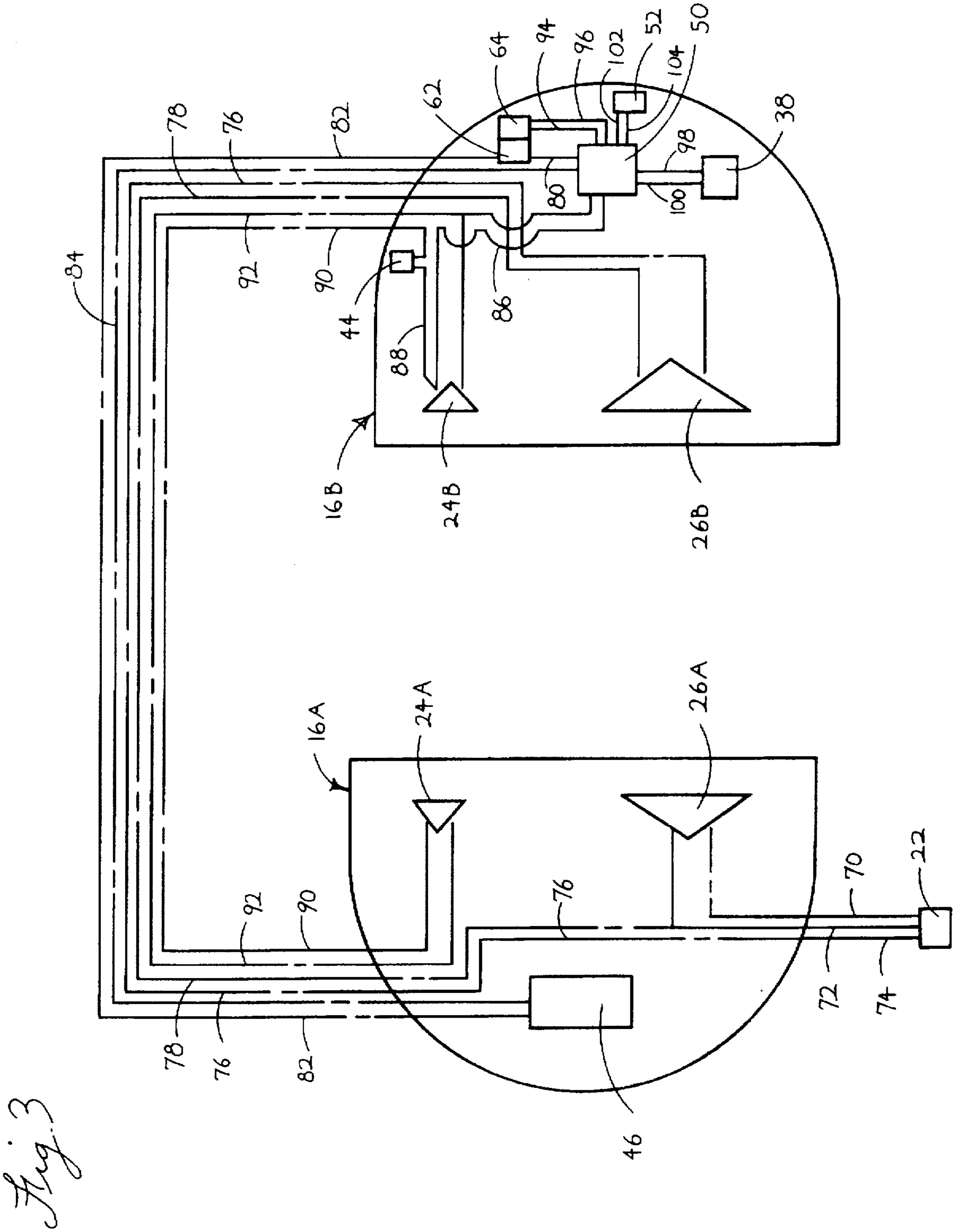
FIG. 3 shows a wiring diagram for a headphone device.

FIG. 3 shows a wiring diagram for a headphone device. Audio signal for speaker 26A enters earcup 16A via plug assembly 22 through a conductor 70 and a common conductor 72. Audio signal for speaker 26B enters earcup 16A via plug assembly 22 through a conductor 74 and a common conductor 72 then continues to earcup 16B through a conductor 76 and a conductor 78. Metronome circuit 50 is connected to power source 46 by a conductor 80 through on\off switch 62 and a conductor 82 then returns through a conductor 84. A conductor 86 connects metronome circuit 50 to the positive side of transducer 24B. A conductor 88 continues on to light indicator 44. A conductor 90 connects light 44 to transducer 24A. The circuit completes through a conductor 92 which connects the negative sides of transducers 24A and 24B back to metronome circuit 50. A conductor 94 and a conductor 96 connect metronome circuit 50 to volume potentiometer 64. A conductor 98 and a conductor 100 connect metronome circuit 50 to line out jack 38. A conductor 102 and a conductor 104 connect metronome circuit 50 to tempo adjustment potentiometer 52.

OPERATION

The manner for using the preferred embodiment of the invention shown in FIG. 1 begins by the user wearing the headphones in the standard position with headband cushion 10 resting on top of the head and earcup assemblies 16A and 16B covering the ears. Once the headphones are being worn in the standard position the wearer can use the headphones as a metronome device alone, as an audio signal reproduction device alone, or as a combined metronome and audio signal reproduction device.

To operate the headphones as an independent metronome device, the user actuates metronome circuit 50 by adjusting on/off switch and volume control knob 40 to the on position. The user continues to turn knob 40 until the desired loudness of the clicking sound produced by metronome transducers 24A and 24B is obtained. The user then increases or decreases the tempo of the clicking sound by turning tempo adjustment knob 34 to the desired level as shown on tempo scale 36. The headphones will now produce a click track that is audible only by the user and which is loud enough to hear even while playing loud instruments, such as drums.

To operate the headphones as an independent audio signal reproduction device, the user inserts stereo plug assembly 22 into any audio amplifier as is common in the industry. Checking to make sure that on/off switch and volume control knob 40 is in the off position as indicated by on/off volume scale 42, the headphones will now only produce sound from any audio amplifier through full range speakers 26A and 26B.

To operate the headphones as a combined metronome and audio signal reproduction device, the user inserts stereo plug assembly 22 into any audio amplifier. The user would then only receive audio signals through speakers 26A and 26B. The user would then actuate metronome circuit 50 by adjusting on/off switch and volume control knob 40 to the on position as indicated by on/off volume scale 42. The user would now be capable of hearing an audio signal through speakers 26A and 26B and a click track through transducers 24A and 24B at the same time.

SUMMARY, RAMIFICATIONS, AND SCOPE

Accordingly, the reader will see that preferred embodiments of the proposed invention encompass several advantages not currently acheived in the industry. Headphones containing an electronic metronome provide a convenient and comfortable means for listening to a click track and or a separate audio input signal. The present invention provides an isolated means of delivering an audible tempo signal while not increasing the amount of cords that might otherwise obstruct a musician. Also, a separate metronome device which is susceptible to being dropped or pulled off of a stand by attached cords is no longer required. Headphones containing an electronic metronome also eliminate the need for an expensive mixing board component to record music and listen to a click track.

Although the descriptions above contain many specifications, these should not be construed as limiting the scope of the invention but as merely providing illustrations of some of the presently preferred embodiments of this invention.

Thus the scope of the invention should be determined by the appended claims and their legal equivalents, rather than by the examples given.

What is claimed is:

1. A headphone unit comprising left and right earcups connected by a headband, an electronic metronome housed in said headphone unit, transducer means for providing audible tempo signals produced from said electronic metronome and housed in said headphone unit, transducer means for providing acoustical reproduction of an electronic audio input signal housed in said headphone unit, cord means connected to said headphone unit providing said audio input signal from an independent source, power supply means fully contained in said headphone unit to actuate said electronic metronome, adjustable means mounted to said headphone unit for increasing and decreasing the volume of said audible tempo signals, adjustable means mounted to said headphone unit altering the speed and or rhythm of said audible tempo signals, adjustable on and off means mounted to said headphone unit to activate and deactivate said electronic metronome, and adjustable means mounted to said headphone unit for increasing and decreasing the volume of said audio input signal.

2. The headphone unit according to claim 1 including a light indicator mounted to said headphone unit providing visual reference means actuating from said electronic metronome.

3. The headphone unit according to claim 1 including signal port means for providing said audible tempo signals from said electronic metronome to independent auxiliary speakers.

4. A headphone unit comprising left and right ear encompassing earcups, a headband connecting said earcups, an electronic metronome housed in said headphone unit, transducer means for providing audible tempo signals produced from said electronic metronome and providing acoustical reproduction of an electronic audio input signal housed in said headphone unit, detachable cord means connected to said headphone unit providing said audio input signal from an independent source, power supply means fully contained in said headphone unit to actuate said electronic metronome, adjustable means mounted to said headphone unit for increasing and decreasing the volume of said audible tempo signals, adjustable means mounted to said headphone unit altering the speed and or rhythm of said audible tempo signals, adjustable on and off means mounted to said headphone unit to activate and deactivate said electronic metronome, and adjustable means mounted to said headphone unit for increasing and decreasing the volume of said audio input signal.

5. The headphone unit according to claim 4 including a light indicator mounted to said headphone unit providing visual reference means actuating from said electronic metronome.

6. The headphone unit according to claim 4 including signal port means for providing said audible tempo signals from said electronic metronome to independent auxiliary speakers.

7. A cordless headphone unit comprising left and right ear encompassing earcups, a headband connecting said earcups, sound insulating earcup cushions secured to said earcups, an electronic metronome housed in said headphone unit, transducer means for providing audible tempo signals produced from said electronic metronome and housed in said headphone unit, power supply means fully contained in said headphone unit to activate said metronome, adjustable means mounted to said headphone unit for increasing and decreasing the volume of said audible tempo signals, adjustable means mounted to said headphone unit altering the speed and or rhythm of said audible tempo signals, adjustable on and off means mounted to said headphone unit to activate and deactivate said electronic metronome, light indicator means mounted to said headphone unit providing visual reference means actuating from said electronic metronome, and signal port means for providing said audible tempo signals from said electronic metronome to independent auxiliary speakers.

* * * * *